United States Patent
Mäkelä et al.

(10) Patent No.: US 7,271,393 B2
(45) Date of Patent: Sep. 18, 2007

(54) UV RADIATION METER USING VISIBLE LIGHT SENSORS

(75) Inventors: Jakke Mäkelä, Turku (FI); Timo Kolehmainen, Oulu (FI); Timo Tokkonen, Oulu (FI); Kai Ojala, Oulu (FI)

(73) Assignee: Nokia Corporation, Espoo (FI)

( * ) Notice: Subject to any disclaimer, the term of this patent is extended or adjusted under 35 U.S.C. 154(b) by 5 days.

(21) Appl. No.: 11/280,144

(22) Filed: Nov. 15, 2005

(65) Prior Publication Data

US 2007/0108389 A1    May 17, 2007

(51) Int. Cl.
*G01J 1/42* (2006.01)

(52) U.S. Cl. .................. 250/372; 250/474.1; 356/435; 356/229

(58) Field of Classification Search ................ 250/372, 250/227, 474
See application file for complete search history.

(56) References Cited

U.S. PATENT DOCUMENTS

| | | | |
|---|---|---|---|
| 4,017,318 A | 4/1977 | Pierson et al. | 106/52 |
| 5,148,023 A | 9/1992 | Hayashi et al. | 250/372 |
| 5,296,275 A * | 3/1994 | Goman et al. | 428/29 |
| 6,211,524 B1 | 4/2001 | Vardeny et al. | 250/458.1 |
| 6,567,158 B1 * | 5/2003 | Falciai et al. | 356/51 |
| 6,963,399 B2 * | 11/2005 | Cargill et al. | 356/328 |
| 7,095,026 B2 * | 8/2006 | Devitt et al. | 250/338.1 |
| 2001/0048081 A1 * | 12/2001 | Yagi | 250/372 |
| 2004/0155199 A1 | 8/2004 | Su et al. | 250/372 |

FOREIGN PATENT DOCUMENTS

| | | |
|---|---|---|
| EP | 1 441 208 A1 | 7/2004 |
| WO | WO 02/35494 A1 | 5/2002 |

OTHER PUBLICATIONS

Analytical Instrumentation Handbook, Second Edition, Revised and Expanded, Edited by Galen Wood Ewing, Published by Marcel Dekker, Inc. 1997, pp. 446-447.*
"Cell Phones Could Prevent Cancer", www.cellular-news.com/story/9287.php, posted Jul. 16, 2003.

* cited by examiner

*Primary Examiner*—Patrick Assouad
*Assistant Examiner*—Yara B Green
(74) *Attorney, Agent, or Firm*—Harrington & Smith, PC

(57) ABSTRACT

An apparatus for quantifying irradiance has a first sensor having an output for providing a reference signal of irradiance within a first band, such as the visible light band. A filter and a second sensor are in optical series so that irradiance sensed at the second sensor is filtered. The second sensor outputs a filtered signal of irradiance within the first band. The filter particularly filters irradiance in the first band as a function of irradiance in the second band, such as the UV light band. In an exemplary embodiment, the filter is made from a material that darkens with increasing UV irradiance. A processor has inputs coupled to the outputs of the first and second sensors for determining irradiance in the second band from the reference signal and the filtered signal. Mathematical formulations for the processor are provided, as are methods and a computer program embodied on a medium. A single sensor embodiment is also described.

21 Claims, 7 Drawing Sheets

UV RADIATION METER USING VISIBLE LIGHT SENSORS

TECHNICAL FIELD

The invention in one aspect relates to determining a level of radiation outside the visible spectrum by manipulating a signal from sensors that detect light within the visible spectrum.

BACKGROUND

The public has become increasingly aware of the risk of skin cancer from overexposure to sunlight. It is widely accepted that the risk lies in overexposure to radiation within the ultraviolet (UV) region, generally considered between $8*10^{14}$ Hz to about $3.4*10^{16}$ Hz. The earth's ozone layer absorbs the vast majority of UV light from the sun, so it never reaches the surface. Humans cannot see UV light very well; the cornea generally absorbs UV radiation at the shorter wavelengths, and the eye lens strongly absorbs beyond 300 nm. For this reason, the amount of sunlight-induced radiation that we perceive ourselves as being exposed to represents only a portion of the overall radiation, the visible spectrum (generally $3.84*10^{14}$ Hz to about $7.69*10^{16}$ Hz or 455-780 nm). This visible spectrum is not a good indicator of UV light exposure, and consequent risk of skin cancer, due to variations in the earth's ozone layer that vary widely in time across the earth.

U.S. Patent Publication No. 2004/0155199 A1 describes a mobile UV-intensity indicator that is mounted on a vehicle or a portable article. The UV-intensity indicator includes a UV detector and an indicator such as a display or an alarm, and warns of overexposure under UV radiation by marking in the display or sounding the alarm. That publication does not provide a particular example of the UV-intensity indicator, but does show recognition of the need for a portable monitor of UV radiation.

It has been reported that a Japanese company, Macnica, has developed a very small UV detector for use in a cellular telephone handset that may be used as part of a UV monitoring service. The Macnica sensor is sensitive to UV light between 270-410 nm, and is reported to have almost no sensitivity to visible light.

While the need for accurate monitoring or measurement of UV light is established, the above solutions are not seen as optimum for the task. Typically, currently available UV sensors are made from silicon carbide, and are relatively expensive components. What is needed in the art is a method of monitoring or measuring UV light that may be performed by less expensive hardware components.

SUMMARY

The foregoing and other problems are overcome, and other advantages are realized, in accordance with the described embodiments of these teachings, which are exemplary and not limiting to the invention.

In accordance with one embodiment, the invention is a method for quantifying irradiance, where irradiance is radiation intensity. In the method, irradiance within a first radiation band is sensed. Irradiance within the first radiation band is filtered, where the filtering is a function of irradiance within a second radiation band, and the filtered irradiance is sensed. Irradiance within the second radiation band is calculated by combining the sensed irradiance with the sensed filtered irradiance.

In accordance with another embodiment, the invention is an apparatus that has a first sensor having an output for providing a reference signal of irradiance within a first radiation band. The apparatus further has a filter and a second sensor in optical series, optical series meaning that radiation sensed at the sensor must first pass through the filter. The second sensor has an output for providing a filtered signal of irradiance within the first radiation band, and the filter operates to filter irradiance in the first band as a function of irradiance in the second band. The apparatus further has a processor having inputs coupled to the outputs of the first and second sensors for determining irradiance in the second radiation band from the reference signal and the filtered signal.

In accordance with another embodiment, the invention is an apparatus that has means for measuring irradiance in a first radiation band, means for filtering irradiance in the first band as a function of irradiance in a second band, and means for resolving irradiance in the second band by comparing measured irradiance in the first band with and without the means for filtering. In one aspect, this embodiment uses two means for measuring irradiance, one of which is means for measuring irradiance that has already passed through the means for filtering. In that particular aspect, the means for resolving irradiance compares outputs from the two separate means for measuring.

In accordance with another embodiment, the invention is a program of machine-readable instructions, tangibly embodied on an information bearing medium and executable by a digital data processor, to perform actions directed toward quantifying irradiance in a first radiation band. The actions include receiving a reference signal and a filtered signal of irradiance within a second radiation band, accessing an information bearing medium to obtain at least a value directly related to gain by which the reference signal is transformed from irradiance in the first radiation band, and then using the gain, the reference signal, and the filtered signal to determine a value of irradiance in a first radiation band.

In accordance with another embodiment, the invention is an apparatus that has a sensor, a filter movable relative to the sensor to be in or out of optical series with the sensor, a computer readable storage medium, and a processor. The sensor has an output for providing a reference signal of irradiance within a first radiation band, especially when the filter is not in optical series with the sensor. When the filter is in optical series with the sensor, the sensor outputs a filtered signal representative of irradiance within a second radiation band. Irradiance in the second radiation band is a function of irradiance in the first radiation band. The computer readable storage medium is for storing at least one of the reference signal and the filtered signal. The processor has inputs coupled to the output of the sensor and to an output of the storage medium for determining irradiance in the second radiation band from the reference signal and the filtered signal.

Other aspects and embodiments of the invention are detailed below.

BRIEF DESCRIPTION OF THE DRAWINGS

The foregoing and other aspects of these teachings are made more evident in the following Detailed Description, when read in conjunction with the attached Drawing Figures, wherein.

DETAILED DESCRIPTION OF EMBODIMENTS OF THE INVENTION

The following terms are used in describing the invention and its embodiments. A mobile station MS is a handheld portable device that is capable of wirelessly accessing a communication network, such as a mobile telephony network of base stations that are coupled to a publicly switched telephone network. A cellular telephone, a Blackberry® device, and a personal digital assistant (PDA) with Internet or other two-way communication capability are examples of a MS. A portable wireless device includes mobile stations as well as additional handheld devices such as walkie talkies and devices that may access only local networks such as a wireless localized area network (WLAN) or a WIFI network.

Figure 1C:
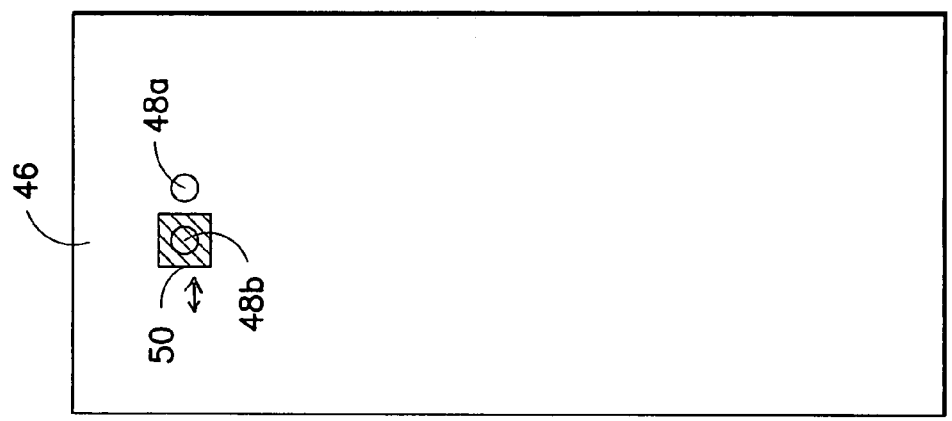
FIGS. 1A-C respectively show a schematic diagram of a mobile station, its front face, and its rear face, according to an embodiment of the invention.
Figure 1B:
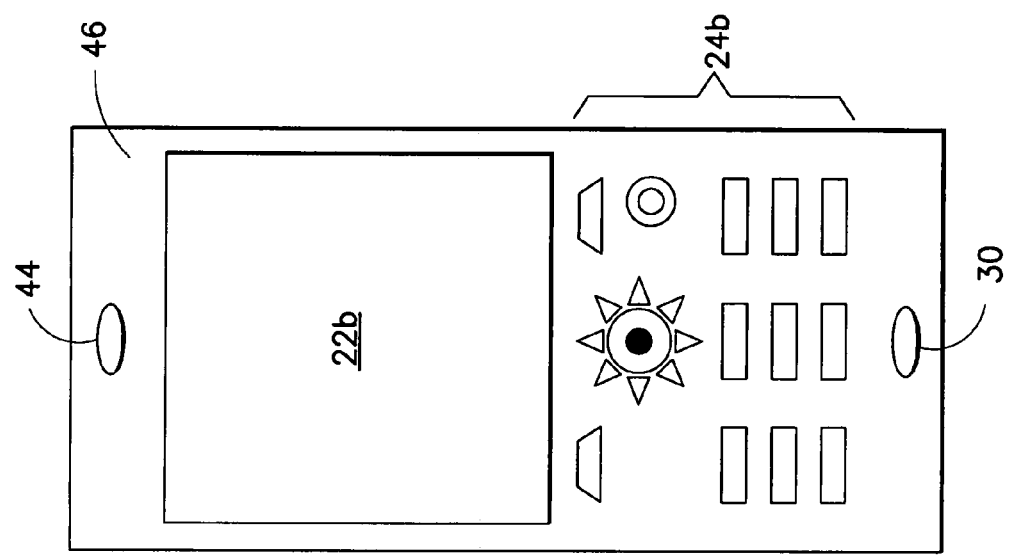
Figure 1A:
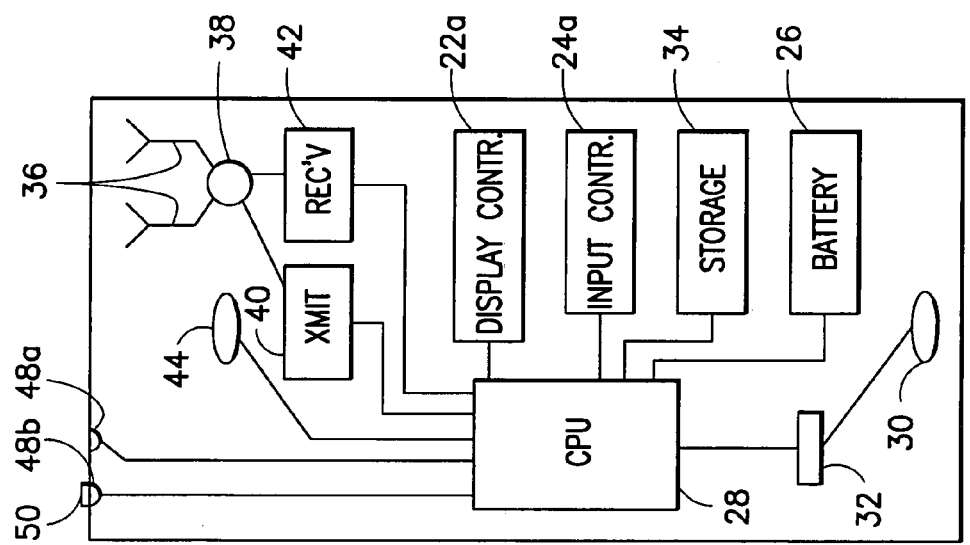

FIG. 1A illustrates in block diagram form a mobile station MS 20 in which the invention may preferably be disposed. The illustrated blocks are functional and the functions described below may or may not be performed by a single physical entity as described with reference to FIG. 1A. A display controller 22a, such as a circuit board for driving a graphical display screen 22b, and an input controller 24a, such as an electronic component for converting user inputs received at an array of user actuated buttons 24b or touch sensitive areas of the display screen 22b, are provided for interfacing with a user. The MS 20 further includes a power source 26 such as a self-contained battery that provides electrical power to a central processor 28 that controls functions within the MS 20. Within the processor 28 are functions such as digital sampling, decimation, interpolation, encoding and decoding, modulating and demodulating, encrypting and decrypting, spreading and despreading (for a CDMA compatible MS 20), and additional signal processing functions known in the wireless communications arts.

Voice or other aural inputs are received at a microphone 30 that may be coupled to the processor 28 through a buffer memory 32. Computer programs such as drivers for the display screen 22b, algorithms to modulate, encode and decode, data arrays such as look-up tables, and the like are stored in a main memory storage media 34 which may be an electronic, optical, or magnetic memory storage media as is known in the art for storing computer readable instructions and programs and data. The main memory 34 is typically partitioned into volatile and non-volatile portions, and is commonly dispersed among different storage units, some of which may be removable. The MS 20 communicates over a network link such as a mobile telephony link via one or more antennas 36 that may be selectively coupled via a T/R switch 38, or a diplex filter, to a transmitter 40 and a receiver 42. The MS 20 may additionally have secondary transmitters and receivers for communicating over additional networks, such as a WLAN, WIFI, Bluetooth®, or to receive digital video broadcasts. Known antenna types include monopole, di-pole, planar inverted folded antenna PIFA, and others. The various antennas may be mounted primarily externally (e.g., whip) or completely internally of the MS 20 housing. Audible output from the MS 20 is transduced at a speaker 44.

Most of the above-described components, and especially the processor 28, are disposed on a main wiring board (not separately shown). Typically, the main wiring board includes a ground plane to which the antenna(s) 36 are electrically coupled. FIG. 1B illustrates the front face of the MS 20 where the display screen 22b and button array 24b penetrate a housing 46 that envelops the MS 20. FIG. 2C illustrate the rear face.

According to an embodiment of the invention, the MS 20 includes two radiation sensors 48a, 48b, preferably identical sensors of visible light except that one sensor 48b is covered with a photosensitive filter 50 (shown exaggerated for clarity). It is noted that preferably the sensors 48a, 48b penetrate the housing 46, but they may be located along a top, side, bottom, or front face as opposed to the rear face illustrated. Alternatively, the sensors 48a, 48b may be disposed along an external face of the device housing or aligned with a housing aperture. While the sensors 48a, 48b are preferably disposed alongside one another, they may be spaced and even on different faces of the MS 20, though close spacing on the same face is preferred to ensure accurate calculation of true UV light as will become evident.

Further, the photosensitive filter 50 is preferably a photochromatic material such as the photosensitive colored glass described at U.S. Pat. No. 4,017,318, or more recent improvements that achieve the effect with plastic, or that use silver halide or silver chloride. Such photosensitive plastics are known in the art of eyeglass manufacturing, commonly a polycarbonate material that changes from clear in low-light (indoor) conditions to become more opaque like dark sunglasses in bright sunlight. One commonly known phototropic material/photosensitive plastic is sold under the trademark Transitions®, though many such materials are commercially available. Functionally, the photosensitive filter operates to filter visible light as a function of irradiance (intensity). Embodiments of the sensor 48b with the photosensitive filter 50 include separately manufactured components that are disposed in line with one another, or the photosensitive filter 50 may be made in one with the sensor 48b such as on a common substrate and inseparable once manufactured.

In another embodiment, only a single sensor need be used. The filter may be movable to lie in series along the optical axis of the sensor, or not. This movement may be physical, as where the filter is rotated away from that optical axis. Alternatively, the movement may be electronic, as where applying a voltage to the filter material causes one filter response and withdrawing the voltage causes the material to exhibit a different filter response. While the filter material does not physically move, the filter as defined by a particular applied voltage (or lack thereof) is moved into or out of optical series with the sensor when that voltage is changed to the point where the filter function changes. Applying or withdrawing the voltage effectively adds in or removes the filter from series with the sensor. One signal, either or both of the reference signal (non-filtered) and/or the filtered signal, may be stored in a computer readable memory. Once one of each signal is present, either from memory or directly from the sensor, a computer processor compares them and provides a user recognizable output.

Underlying principles of the invention are now detailed. As above, sunlight has both a visible component $S_v$ and an ultraviolet component $S_u$, detailed below. The two sensors 48a, 48b are sensitive to visible light. Such sensors are well known, widely available, and relatively inexpensive, sometimes referred to as ambient light sensors. For example, mobile stations with cameras typically include one such sensor for determining integration time of the imaging array, or for determining whether or not to operate with a flash. In other presently known mobile stations such as the Nokia model 7650, a sensor sensitive to visible light is used to measure ambient light level in order to control display and keypad lighting. Preferably, the first sensor 48a will have a cover to protect it from environmental damage such as dust or sand or pointed objects, but such a protective cover is not known to alter one spectrum of light sensed at the first sensor 48a relative to another spectrum. Thus, the first sensor 48a detects a reference signal. Though both UV and visible light may impinge on the first sensor 48a, it is sensitive only to light in the visible range, so the light detected, and output as the reference signal, is wholly visible light, $S_v$.

The filter 50 darkens as a function of ultraviolet light, $S_u$. But that darkening operates to filter light in the visible spectrum. Therefore, the light that impinges on the second sensor 48b, after the filtering, is diminished in the visible band as compared to the reference signal. This is true for all times that both visible and ultraviolet light is present. This diminishment is a function of the amount of ultraviolet light present at the filter 50, and the specific response of the photosensitive material of which the filter 50 is made. If we term the radiation sensed at the second sensor 48b (and output from it) as the filtered signal, the difference between the reference signal and the filtered signal is a function of the amount of ultraviolet light at the filter 50. This function is determined from the known response of the filter 50 and the specific photosensitive material of which it is made.

Mathematically, consider the attenuation of the visible light signal as the function $D(S_u)$. Then the reference signal is represented by $S_v$, and the filtered signal is represented by $D(S_u)*S_v$, which is less than $S_v$ anytime both visible and ultraviolet light is present because $D(S_u)<1$. If no ultraviolet light is present, then $D(S_u)=1$ and the signals are identical; if no visible light is present, then $S_v=0$ and there is no signal. Ideally, since the calculation of UV light relies on the difference between the reference signal and the filtered signal, covers over both to protect against environmental damage (dust, etc.) are identical except that the cover of the second filter 48b is photosensitive (e.g., a coating), and the sensors 48a, 48b, themselves are also identical. The difference $\Delta$ between the reference signal and the filtered signal is then $\Delta=S_v[1-D(S_u)]$. Rearranging terms to yield $D(S_v)=1-\Delta/S_v$ shows that the value of $S_u$ can be readily calculated. For example, if $D(S_u)=e^{-Su}$, then $S_u=\log[1-D(\Delta/S_v)$.

A more exact calculation simplifies to the same principle. Using the parenthetical (w) to indicate dependence on wavelength, let sunlight have an energy spectrum S(w), and the environmental-protective cover attenuates light as A(w)<1. The intensity is transformed to an electric signal with gain G(w)<1. The gain goes to zero outside the visible range. The total intensity of the reference signal T1 is the integral of this over visible wavelengths:

$$T1 = \int_{VIS} A(w)S(w)G(w)dw \qquad [1]$$

The total ultraviolet light U reaching the sensor (though not detected/measured because the sensor is sensitive to the visible band) is $$U = \int_{UV} A(w)S(w)dw. \qquad [2]$$

The photosensitive filter material darkens as a function of the UV light, meaning that a new attenuation term D(w,U)<1 is added to the equation. D(w,U) is thus a nonlinear function of the UV intensity U. The filtered signal T2 is therefore $$T2 = \int_{VIS} A(w)S(w)G(w)D(w,U)dw \qquad [3]$$

When all the functions are known, the value of U can readily be calculated as an inverse problem.

The above equations may be simplified without much loss of precision. The attenuation function A(w) due to the environmental-protective cover can often be considered a constant. Similarly, the gain function G(w) is often either nearly constant or else strongly peaked at some specific wavelength. Also, the term D(w,U) is usually well approximated by a constant D(U) over the visible wavelengths. In the case of a constant gain, $$T1 = AG\int_{VIS} S(w)dw == Sv \qquad [4]$$

and $$T2 = AG\int_{VIS} S(w)D(w,U)dw == D(U)Sv \qquad [5]$$

which is the simplest formulation.

If the gain has a strong peak at G(c), then $$T1=A(c)*G(c)*S(c), \qquad [6]$$

and $$T2=A(c)*G(c)*S(c)*D(UV) \qquad [7]$$

which again is similar to equations [4] and [5] above.

For more complex profiles of A(w), S(w), G(w),and D(w) where they cannot be considered constant, resolution of the particular functions might not be gained analytically but can be calculated numerically or determined empirically by plotting a series of measured data points and finding a best-fit or least-squares curve when designing the overall measuring system.

The values of A(w), S(w), G(w), and D(w) for both sensors 48a, 48b, are stored in the memory 34 of the device 20, such as in a lookup table that returns a specific value for each in response to an input wavelength. In the simple case, they are simply constants. For the very simplest case, only the product A*G needs to be stored.

The above calculations are performed by software and/or hardware, represented in the MS 20 as the memory storage 34 and the processor 28. Outputs from the sensors 48a, 48b, are received at the processor 28, which calculates the difference signal using a software program stored in memory 34, and preferably compare the difference signal to a threshold value stored in memory. Once the difference signal exceeds the stored threshold value, an indication may be provided to the user of the device 20, such as an audible alarm at the speaker 44, a visual display at the graphical display screen (e.g., a message such as "UV exceeds safe level! Avoid prolonged exposure!"), or the like.

Figure 2:
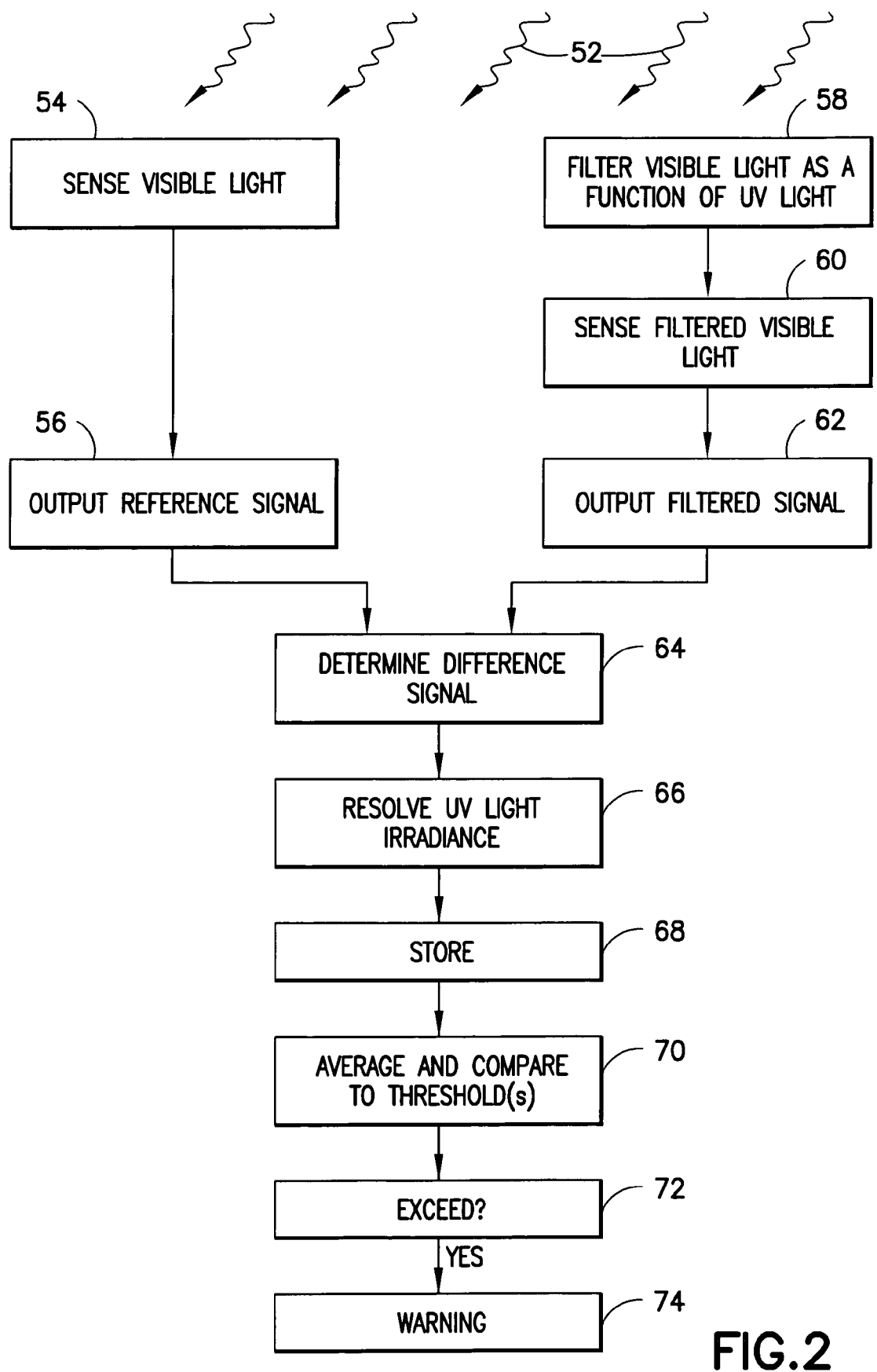
FIG. 2 is a flow diagram of method steps according to an embodiment of the invention.

Method steps of an embodiment of the invention are shown in FIG. 2. Ambient radiation 52, which has radiation in two separate bands (e.g., visible and UV), is incident at a sensor. As detailed above, there are preferably two sensors 48a, 48b, but the method may be executed with only one sensor as where the filter 50 is moveable or otherwise adjustable to have a different attenuation on radiation in one band that also affects its filtering of the other band, and the first-sensed signal is stored for later combination with the second-sensed signal. The two-sensor embodiment is described in detail for the method of FIG. 2. Radiation in the first band is sensed at box 54, the first sensor 48a, and a reference signal is output at box 56. Preferably simultaneously, the first band of radiation of the ambient radiation 52 is filtered at box 58, with the provision that the filtering in the first band is a function of radiation in the second band that is present in the ambient radiation 52. In the exemplary embodiment, the amount of visible light filtering done by the filter 50 depends on the amount of UV radiation within the ambient sunlight; more UV light causes the filter to darken, and thus less visible light to pass. The filtered visible light is then sensed at box 60, and a filtered signal is output at box 62.

The two signals are then combined to determine a difference signal at box 64, and the amount of radiation in the second band (the UV band) is determined at box 66 as detailed in the mathematical description above. This value is stored at box 68 in a memory, and preferably averaged over some time period (as little as a few minutes to as much as eight hours or more, depending upon the availability of health-related UV exposure data for various time periods). The averaged value is compared at box 70 to a threshold stored in the memory. If the threshold is exceeded 72, a warning is issued at box 74 such as an audible alarm or more preferably a text-based notice on the graphical display screen 22b. It is noted that boxes 68, 70, 72 and 74 are peripheral to what are considered the more basic elements of the method.

A single point measurement may not give a very reliable estimate (e.g. a cloud passing briefly over the sun will decrease the UV level considerably). In practice, several measurements need to be taken until the measurement is seen to stabilize. Additionally, multiple measurements may be stored and accumulated over time, and compared to a time-specific threshold. For example, an eight-hour exposure at a first threshold may exhibit an enhanced cancer risk as compared to a short-term exposure at a much higher second threshold.

The stored difference signals (or even the paired reference and filtered signals) might be stored locally at the MS 20 for a time and further communicated to some central hub (e.g., Internet server) that collects data for individual users as it is periodically sent, and sends an alert when a particular user's stored and transmitted difference signals exceed a threshold stored at the central hub. The advantage in the central hub arrangement is that the central hub may track historical exposure levels such as over weeks or months, whereas in current embodiments, MS's 20 typically have more limited storage capacity.

As with all measurement systems, there are potential sources of error. Decalibration of the sensor 48a, 48b results in the value for G(w) being in error; changes to the filtering response of the filter 50 (e.g., changes in photochomasticy) results in the value for D(w,U) being less accurate; and scratches or dirt on the environment-protective covers results in the attenuation figure A(w) being inaccurate. It may be advisable in certain instances for the user to ensure the components are calibrated regularly. Of the above, only changes to the filtering response are seen as particular to this invention as compared to those detectors noted in the background section.

Although good calibration methods are often not simple, the user can be guided to perform fairly simple calibration indoors. This is the case of D(w,UV)=1 throughout. In the case of equations [4] and [5] or equations [6] and [7], this means that if there is a differential, the values of attenuation A and/or gain G are in error. Although it is not possible to know which ones are incorrect, the products A*G can be adjusted until they are equal.

It is recognized that temperature affects the response of the filtering material, in that the filtering material responds more quickly to changes in incident UV light at colder temperatures. This difference in response time is not seen to bear on the final response (e.g., level of darkening), only how fast it is achieved. The more important aspect for the invention is seen to be an accurate final response, so temperature dependence is not seen to be a substantial concern. Choice of filtering material can minimize considerations of slow response at warmer temperatures. The Transitions® material approximated in the simulations below is not seen to be the best available material if speed of the filter response is a major consideration, so other commercially available or yet to be developed materials may be incorporated.

A possibility is seen for the sensors 48a, 48b to saturate when exposed to full sunlight. This can be avoided by tinting the non-filtering cover (over both sensors 48a, 48b), or by selecting a particular sensor for which saturation will not reasonably be a concern. In either case, there is a design tradeoff between avoiding saturation at high levels of visible light, and sensitivity at lower levels. However, in natural lighting environments, a lower level of sunlight also means a lower level of UV, so sensitivity at the low visible light levels is not seen as particularly problematic when the invention is used as a health-related monitor. The sensor and tint may be chosen to just avoid saturation in the heaviest imaginable tropical sunlight, which avoids saturation in the most extreme environment reasonably anticipated yet retaining low-level sensitivity as much as practical.

It is recognized that the above embodiments operate on a principle that may not accurately quantify UV light in certain un-natural lighting situations, where UV light is present but very little natural light. Such a situation is seen to occur in limited circumstances: UV solariums, discos with "black light" effects, etc. Either the user may be informed that the above embodiments are accurate in quantifying UV levels only in natural light conditions, or the sensors 48a, 48b (or implementing software) can be limited to operate only when the visible light level exceeds a threshold level.

Figure 3:
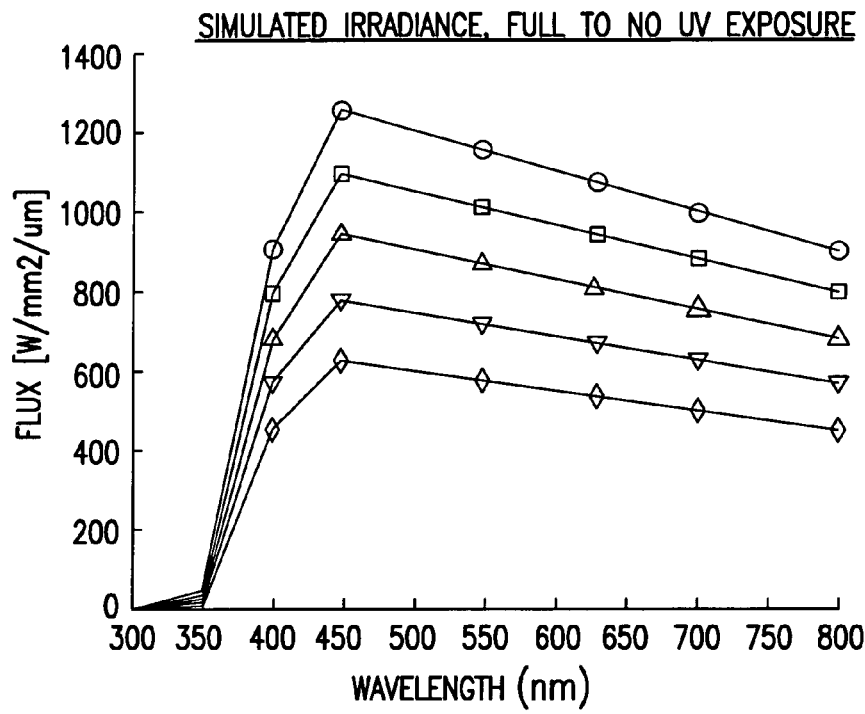
FIG. 3 is a simulated graph of flux versus wavelength response at five exposure levels.

The following presents some simulation results that the inventors have derived. Clear glass, such as that in the windows of a home or car, is known to block substantially all of the UV light and up to 50% of the visible light. The transmittance of glass is assumed to be independent of the wavelength for visible light. FIG. 3 illustrates a simulated flux versus wavelength response at five exposure levels. The lowermost data line corresponds to being indoors (e.g., clear glass as a filter) and the uppermost data line corresponds to the irradiance spectrum outdoors (unfiltered). The intermediate data lines are linearly interpolated between those two extremes.

Figure 4:
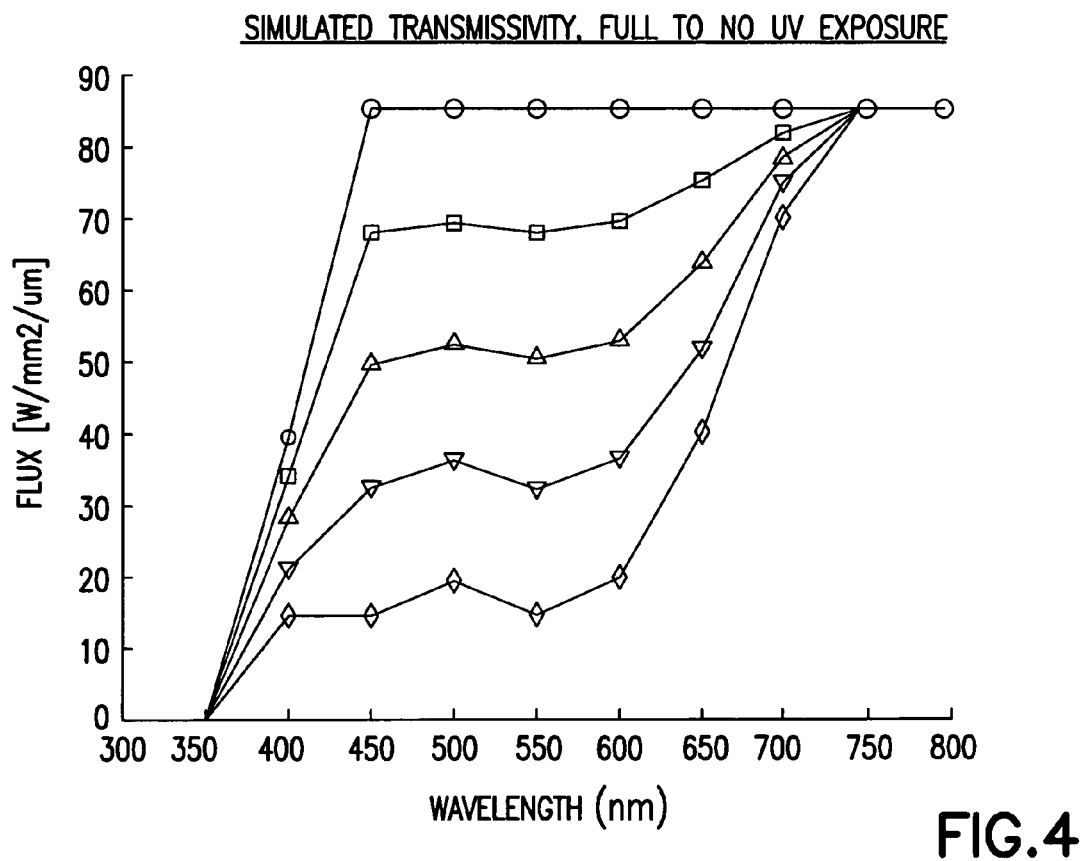
FIG. 4 is similar to FIG. 3, but showing data simulated to mimic the response of a commercially available phototropic material.
Figure 5:
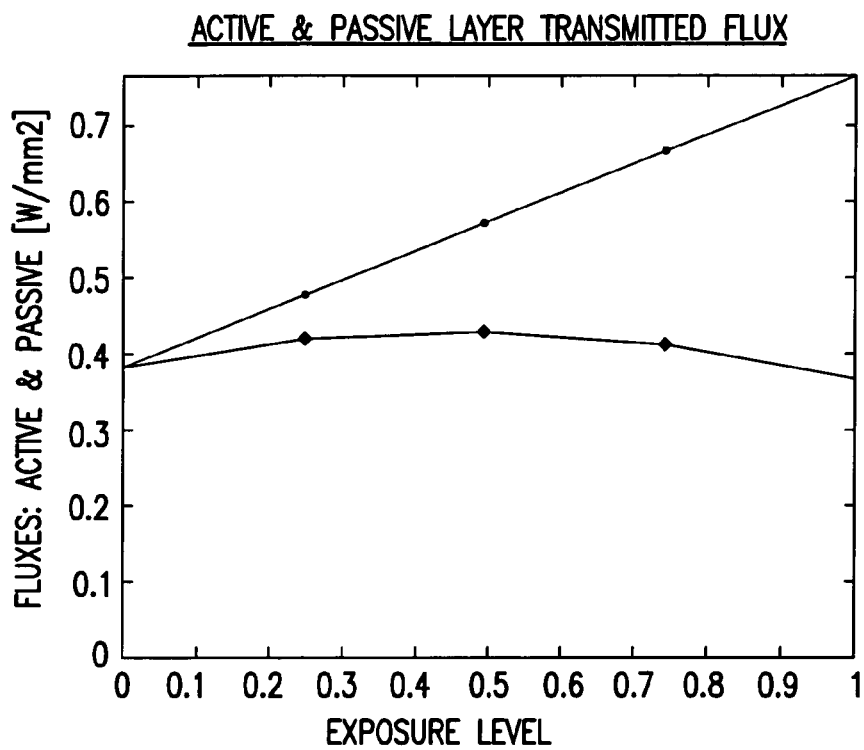
FIG. 5 is a graph comparing flux at various exposure levels between the simulated phototropic material of FIG. 4 and an environmental cover whose response in the visible range is not a function of UV level.

The data of FIGS. 3-6 simulate a material that has asymptotic behavior similar to the Transitions® material at high and low UV levels, but the intermediate levels have been interpolated for completeness. FIG. 4 illustrates a similar approximation of data lines as in FIG. 3. The uppermost data line is the known transmittance when no UV is present (passive state). The lowermost data line is the known transmittance when the UV level has reached full saturation (which is assumed to be the level outdoors). The intermediate levels have been interpolated between the extreme values.

Thus for each exposure level, there is a different wavelength spectrum and a different transmissivity spectrum in the filtering material. The total integrated flux will then be different depending on the UV exposure level. The differences between the filtering material (denoted as active layer) and the environmental cover only (denoted as passive layer) are then calculated in FIG. 5 for each of the five shadiness states, where 0.0 represents indoors (no UV light) and 1.0 represents outdoors. The flux difference between filtering (active layer, lower data line) and environmental-only cover (passive layer, upper data line) grows roughly linearly and can be used to estimate the UV flux.

Figure 6:
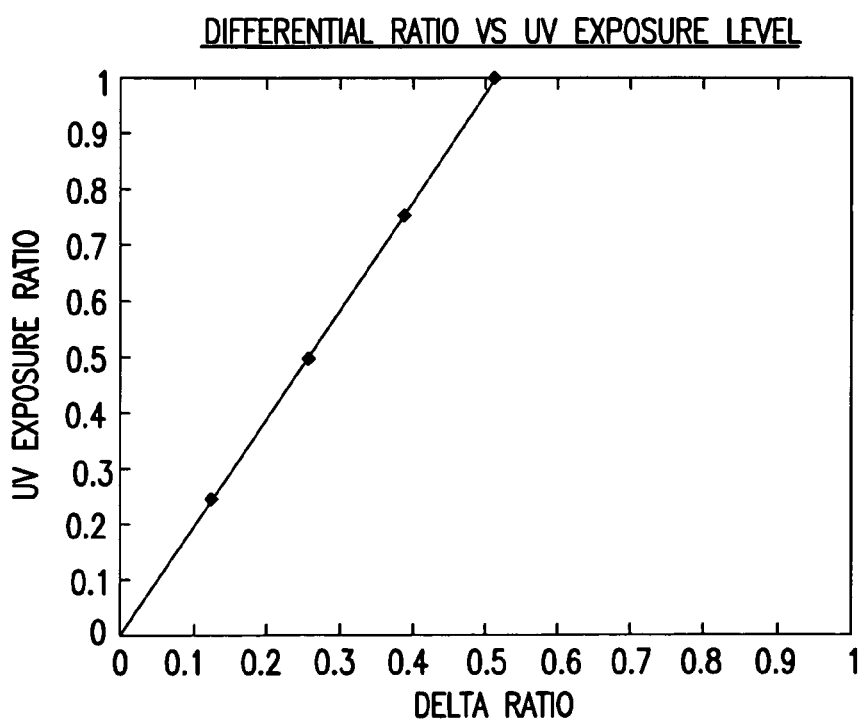
FIG. 6 is a graph of differential ratio as a function of UV exposure level for the phototropic material of FIG. 4.

FIG. 6 shows the differential ratio [(Passive-Active)/Passive] as a function of UV exposure level. An error of 10% in the delta ratio leads to an error of ~20% in the UV ratio. The delta ratio along the horizontal axis of FIG. 6 is the ratio of active flux to passive flux (see FIG. 5). The UV exposure ratio along the vertical axis of FIG. 6 is the corresponding ratio of UV level to saturation UV level (UV flux divided by the UV flux that saturates the particular phototropic material). The method is thus not as stable, using the simulated data, as the inventors would prefer for a commercial product. Any of the various photo-sensitive materials currently available can be tested to improve that stability.

Figure 7A:
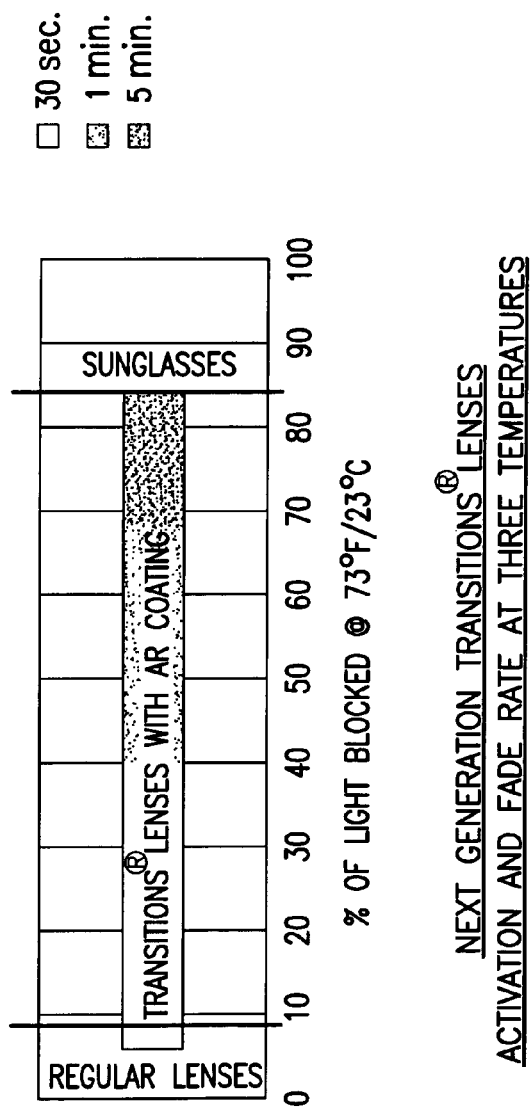
FIGS. 7A-7C are data graphs for the Transitions® filtering material that was used to generate the simulated data for the graphs of FIGS. 3-6 and 8.
Figure 7B:
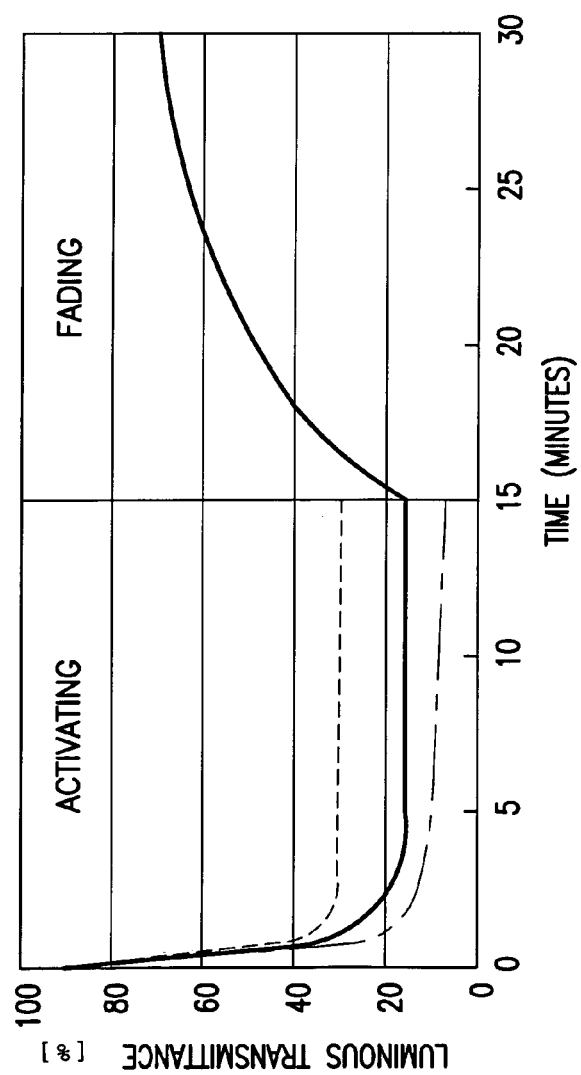
Figure 7C:
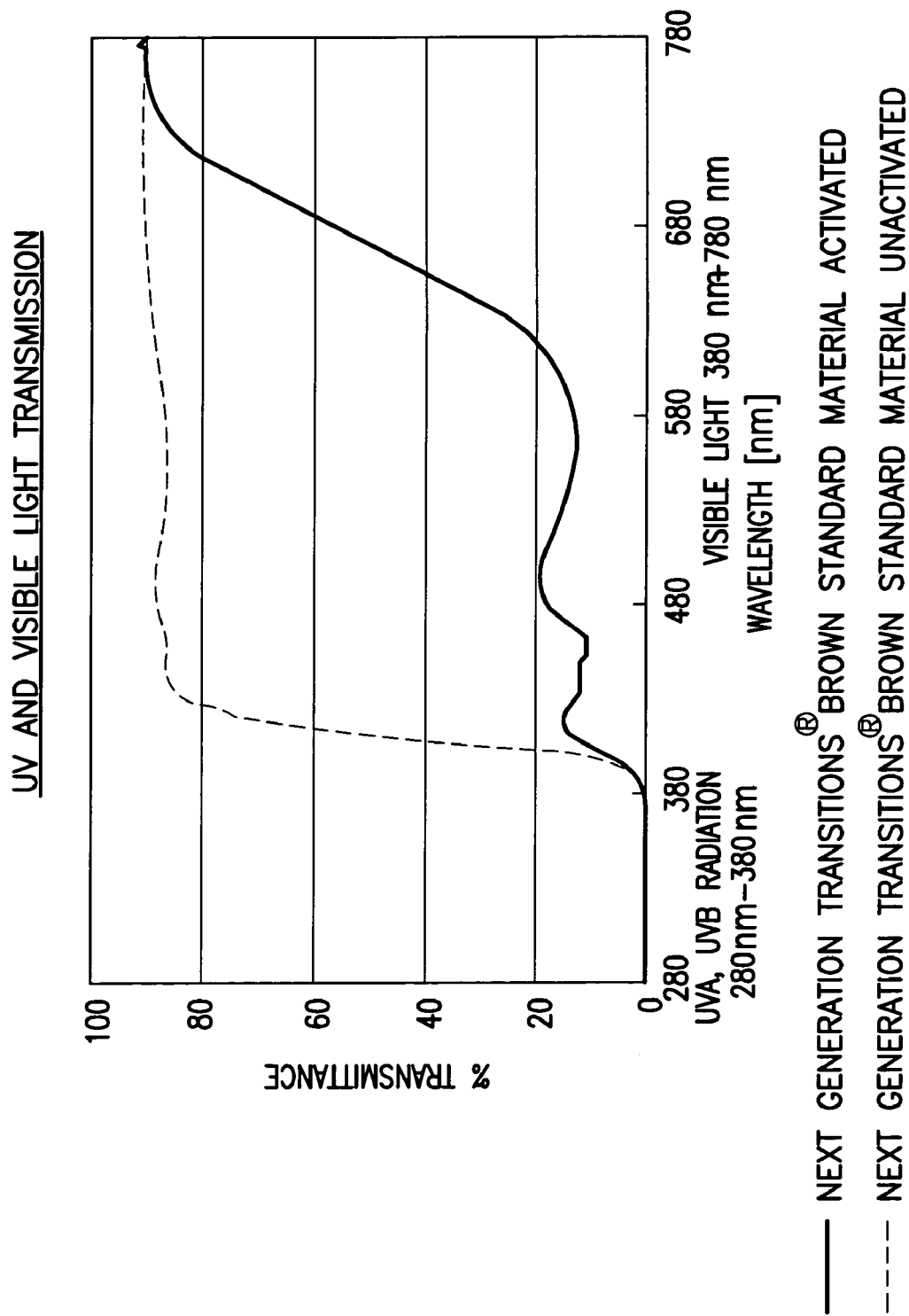

From FIG. 7A and FIG. 7B, it is seen that the filtering material response to change visible light filtering in response to UV light levels can take a few minutes to reach full saturation. FIG. 7B is not a true measurement of the time behavior but a simulation; time development of the active material transmittance (FIG. 4) is not known with accuracy to the inventors at this point in time. However, if the assumption is made that the transmittance spectrum varies linearly with time before reaching the spectrum for the final activity level, a crude estimate of the time dependence can be estimated. It is seen that since the system is linear, it is possible to invert the time dependence, so that taking two measurements at known intervals gives a much more accurate value for the UV exposure level than a single measurement.

Figure 8:
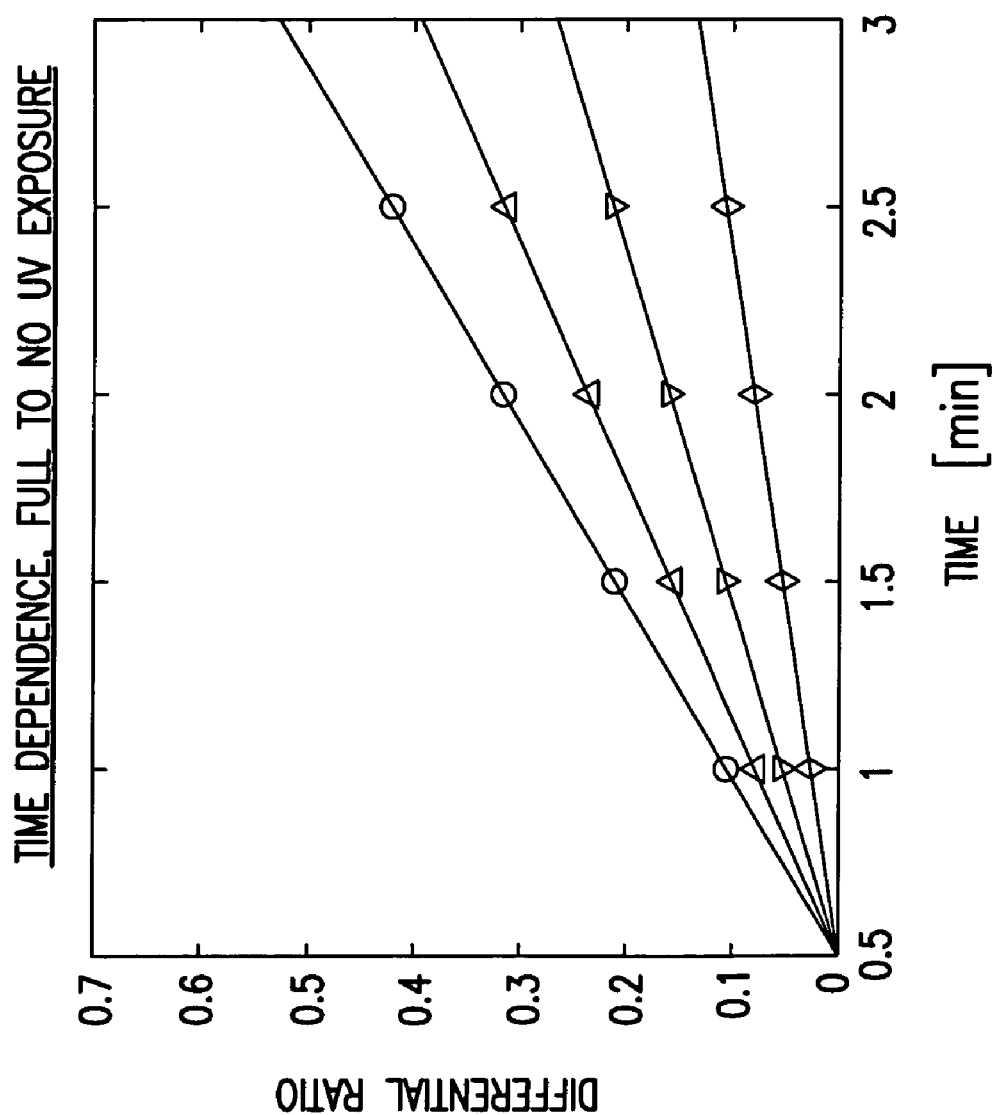
FIG. 8 is a graph of differential ratio versus time for various levels of UV exposure for the phototropic material of FIG. 4.

The simulation shown in FIG. 8, plots of differential ratio versus time for various levels of UV exposure, shows that with some approximations and educated guesses, the fundamental principle of the above embodiments should work for currently existing filtering materials. In FIG. 8, the lowermost data line represents no UV exposure and the uppermost data line represents full UV exposure (natural sunlight).

It is noted that the invention is not limited to resolving UV light using visible light sensors; the broader teachings herein relate to resolving radiation in one band by sensing radiation in another, and filtering suing a filter whose response in the first band depends on radiation in the second. It is notable that radiation in the second band is not sensed at either sensor, its presence is quantified by inference based on the value of the difference signal.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

What is claimed is:

1. A method for quantifying irradiance comprising:
    sensing irradiance within a first radiation band at a first sensor;
    filtering irradiance within a first radiation band, where the filtering is a function of irradiance within a second radiation band;
    sensing the filtered irradiance at a second sensor;
    calculating irradiance within the second radiation band by combining the sensed irradiance with the sensed filtered irradiance and
    providing an output signal to a user at least when the calculated irradiance within the second radiation band exceeds a stored threshold value.

2. The method of claim 1, wherein the second radiation band is within the ultraviolet radiation band.

3. The method of claim 2 wherein the first radiation band is within the visible light radiation band.

4. The method of claim 1, wherein sensing irradiance in the first radiation band is by a first sensor, and sensing the filtered irradiance is by a second sensor.

5. The method of claim 4, wherein sensing irradiance within the first radiation band and sensing filtered irradiance are substantially concurrent.

6. The method of claim 1, wherein providing the output signal comprises storing the calculated irradiance within the second band in a memory, comparing the stored calculated irradiance to a the stored threshold value, and providing the output signal at a device that executes the method.

7. The method of claim 6, wherein the device comprises a mobile station.

8. The method of claim 1, wherein the function of irradiance within the second radiation band is non-linear.

9. An apparatus comprising:
    a first sensor having an output for providing a reference signal of irradiance within a first radiation band;
    a filter and a second sensor in optical series, the second sensor having an output for providing a filtered signal of irradiance within the first radiation band, where the filter operates to filter irradiance in the first radiation band as a function of irradiance in the second radiation band; and
    a processor having inputs coupled to the outputs of the first and second sensors for determining irradiance in the second radiation band from a combination of the reference signal and the filtered signal.

10. The apparatus of claim 9, wherein the second radiation band is within the ultraviolet radiation band.

11. The apparatus of claim 10, wherein the first radiation band is within the visible light radiation band.

12. The apparatus of claim 10 wherein the first and second sensors are configured to provide simultaneous outputs of respective reference signals and filtered signal.

13. The apparatus of claim 10, further comprising a storage media coupled to the processor for storing the determined irradiance.

14. The apparatus of claim 13, further comprising one of a graphical display screen and a speaker for providing an indication of the determined irradiance to a user based on the value of the determined irradiance.

15. The apparatus of claim 10, wherein filter function of irradiance in the second radiation band is a nonlinear function.

16. The apparatus of claim 9 embodied within a mobile station.

17. An apparatus comprising:
   means for measuring irradiance in a first radiation band;
   means for filtering irradiance in the first radiation band as a function of irradiance in a second radiation band;
   means for measuring the filtered irradiance; and
   means for resolving irradiance in the second radiation band by combining measured irradiance in the first radiation band with the measured filtered irradiance in the first radiation band.

18. The apparatus of claim 17, wherein the means for measuring irradiance comprises a visible light sensor, the means for filtering comprises a photosensitive filter whose opacity to visible light changes as a function of irradiance in the ultraviolet band; and the means for measuring the filtered irradiance comprises another visible light sensor in optical series with the photosensitive filter.

19. A program of machine-readable instructions, tangibly embodied on an information bearing medium and executable by a digital data processor, to perform actions directed toward quantifying irradiance in a first radiation band, the actions comprising:

receiving a reference signal of irradiance within a second radiation band and a filtered signal of irradiance within the second radiation band;

accessing an information bearing medium to obtain at least a value directly related to gain by which the reference signal is transformed to the filtered signal;

using the gain, the reference signal, and the filtered signal, determining a value of irradiance in the first radiation band; and outputting a signal to a user at least when the determined value of irradiance within the first radiation band exceeds a stored threshold value.

20. The program of claim 19,
   wherein receiving the reference signal and the filtered signal is from at least one sensor having a cover;
   wherein the value directly related to gain comprises a gain value;
   wherein accessing further comprises obtaining an attenuation value related to the sensor cover and a relation between visible light and UV light;
   and further wherein determining a value of the irradiance in the first radiation band comprises using the gain value, the reference signal, the filtered signal, the attenuation value, and the relation.

21. An apparatus comprising:
   a sensor having an output for providing a reference signal of irradiance within a first radiation band;
   a filter, movable relative to the sensor to be in or out of optical series therewith, for causing the sensor to output a filtered signal of irradiance within the first radiation band as a function of irradiance in a second radiation band when in optical series with the sensor;
   a computer readable storage medium for storing at least one of the reference signal and the filtered signal; and
   a processor, having inputs coupled to the output of the sensor and to an output of the storage medium, for determining irradiance in the second radiation band by combining the reference signal and the filtered signal.

* * * * *